Sept. 28, 1965   E. WILMES   3,208,222
BATTERY OPERATED INDUSTRIAL TRUCK
Filed July 18, 1963   2 Sheets-Sheet 1
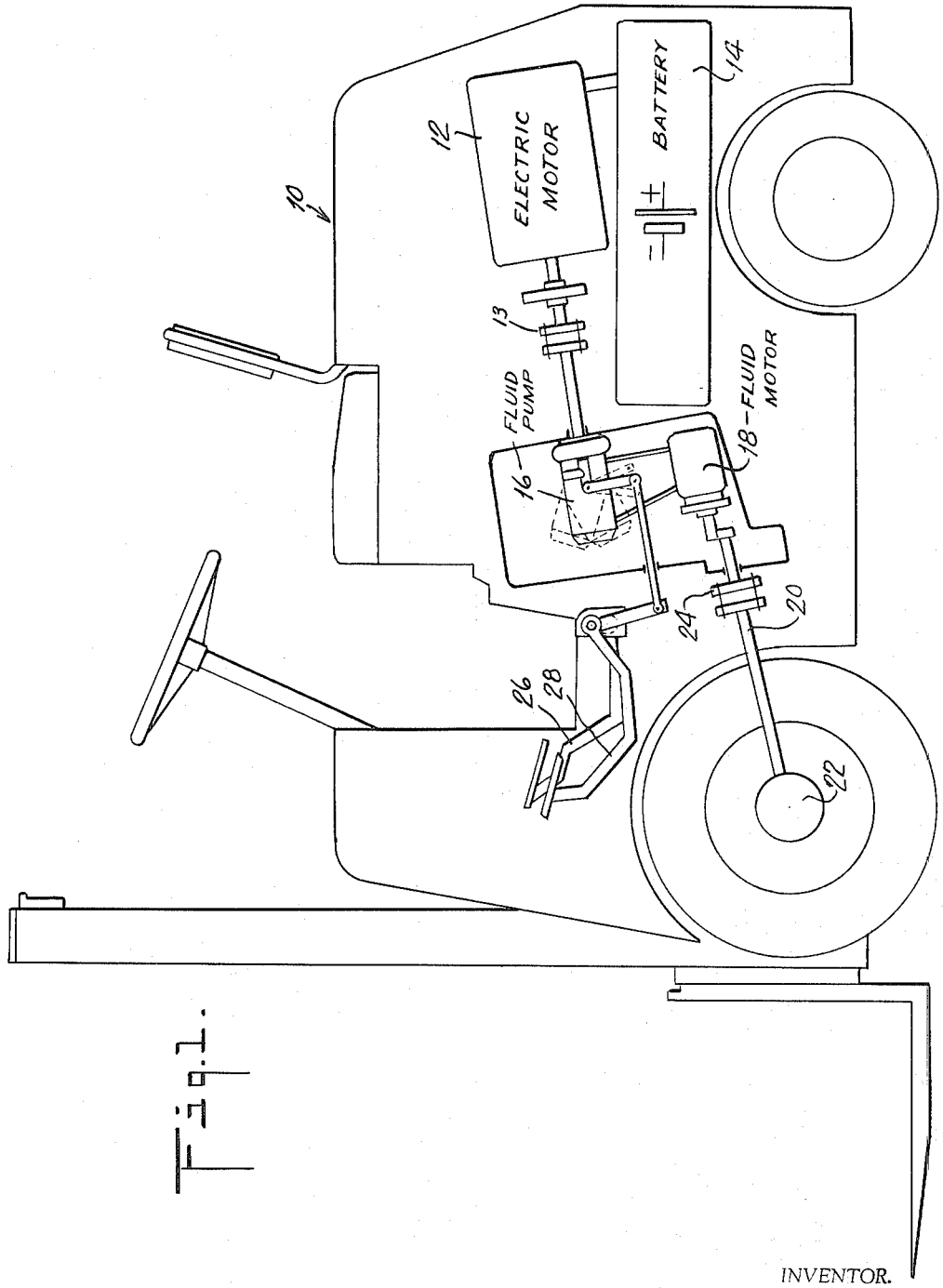
INVENTOR.
ERNST WILMES
BY
Robert S. Dunham
ATTORNEY Sept. 28, 1965
E. WILMES
3,208,222
BATTERY OPERATED INDUSTRIAL TRUCK
Filed July 18, 1963
2 Sheets-Sheet 2
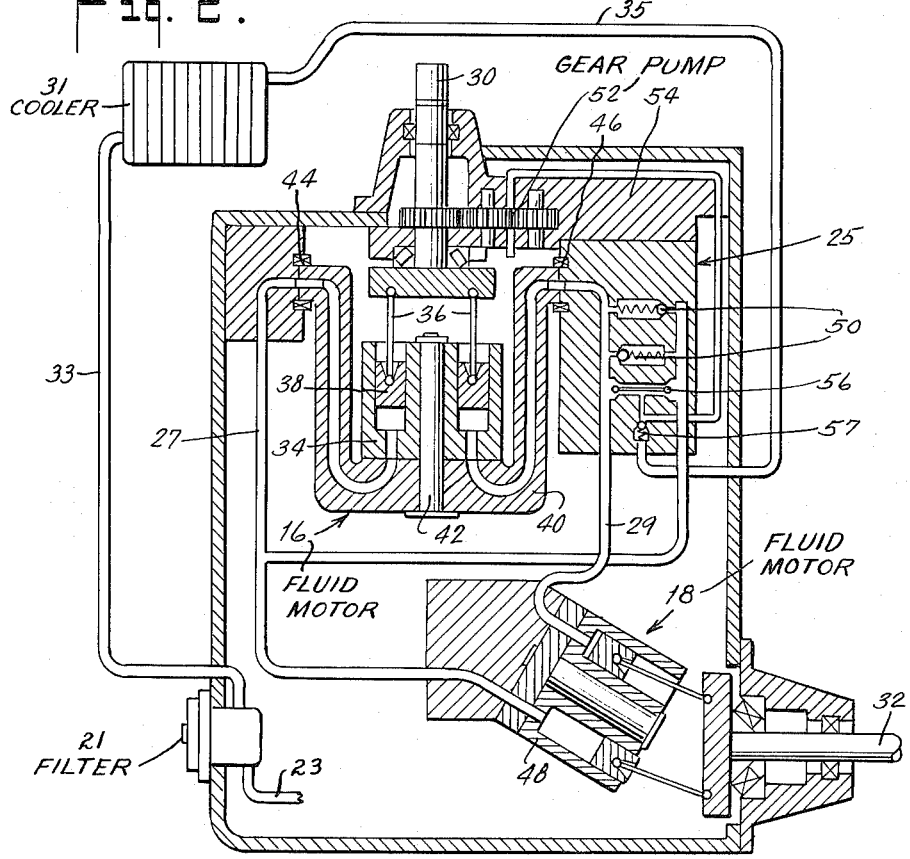
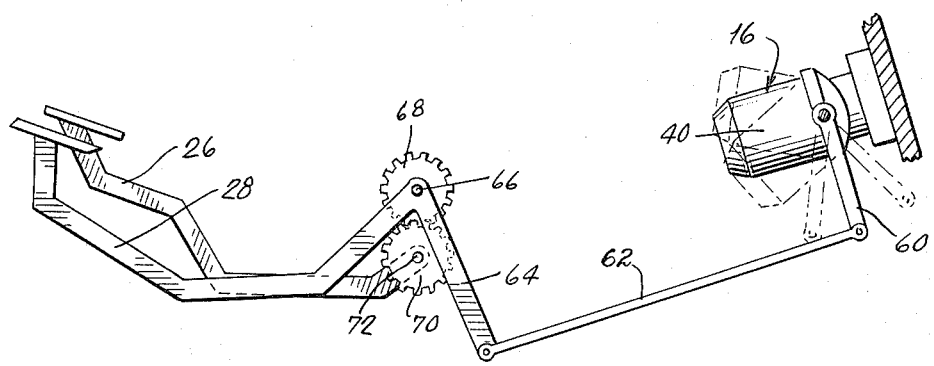
INVENTOR.
ERNST WILMES
BY
Robert S. Dunham
ATTORNEY 3,208,222
BATTERY OPERATED INDUSTRIAL TRUCK
Ernst Wilmes, Hanau (Main), Germany, assignor to Atlas Industriewagen G.m.b.H., Frankfurt am Main, Germany, a German corporation
Filed July 18, 1963, Ser. No. 296,020
3 Claims. (Cl. 60—53)

Vehicles that do not run along rails, in particular carts that run upon floors, such as forklift trucks, electric hauling cars, or the like, are driven, among other ways, by means of direct current electric motors that are supplied from a battery, in particular a rechargeable battery of accumulators. Usually, a mechanical reduction gear drive is provided between the direct current motor and the drive axle or drive wheels of the vehicle. The motion of the vehicle is controlled by switching the motor on or off, and the direction of travel is changed through reversing the direction in which the motor turns. With drives of this kind, regulation of the speed is usually effected by switching resistances into the electrical circuit. Doing this results in substantial losses, so that this kind of drive is relatively uneconomical, and makes necessary frequent charging of the battery. This kind of drive moreover requires, because of the high starting torque, large and heavy motors; and the battery, with the frequent starting and reversal of direction of travel, is subjected to extraordinarily large loads, and such loads, as practical experience has shown, can lead to the allowable discharge of current strength of the batteries being exceeded. The purpose of the invention is to create a drive by means of which such losses can be avoided to a great extent whereby good regulation can be obtained. In addition, the load upon the battery is substantially reduced, and, with the same or even a lower total weight of the drive unit, consisting of the battery, motor, and drive or transmission, increased efficiency and performance, and in particular an increased ability of the vehicle to climb, up ramps for example, is obtained.

The drive for a vehicle that does not run along rails and that is driven by a battery supplied direct current motor is, in accordance with the invention, constructed as a combination of a compound motor, having a series-wound characteristic, with a fluid drive. Use is preferably made of a hydrostatic drive or transmission, consisting of a piston-type oil pump and a piston-type oil motor, although in principle the essential advantages of the invention can be obtained with a fluid drive of different design.

With the drive of the invention, regulation of the speed, between standing still of the vehicle and its maximum speed in either the forward or backward direction, is obtained by regulation of the output speed of the fluid drive, which is done in a way that is of itself known. That is, the piston stroke, and thus the amount pumped, and on occasion also the direction in which the oil-pump pumps, is infinitely variable between zero and the maximum value. This oil pump is driven from the compound motor. The pump can be of the axial piston or of the radial piston design. The electromotor continues running without reversal of the direction in which it turns.

The characteristic of the compound motor is preferably selected so that the shunt portion of the winding prevents excessive motor speed when the motor is relieved of load; while when there is a greatly increasing load, which exceeds the normal maximum load (overload), then the rotary speed of the compound motor decreases to half speed or less.

It is particularly advantageous to "over-dimension" the fluid drive; that is, to select a drive designed in such a way that it acts as a torque converter. Thus it is for example possible to use a drive whose allowable transmission performance amounts to three to five times, or more, the motor performance. This makes it possible, while having a relatively low output from the motor, for example, in the case of a fork-type lift truck weighing with its load about 3300 kg. [some 7300 pounds], to install a low power motor of about 4 H.P., with which however, by means of the fluid drive, a gradient of 30% and more can be climbed. In accordance with the invention, it is therefore possible to combine the mechanical regulation of the fluid drive or transmission and the load dependent automatic change of motor speed, and this, namely, in such a way that when the maximum load is exceeded, and which, in a drive having a mechanical reduction gear, would endanger the motor and on occasion the battery, overloading of the motor and of the battery does not occur.

Because the drive, according to the invention, makes it possible to make the vehicle travel up steep ramps, it is advantageous when traveling downhill, and also for a braking action when traveling on the level, to provide an efficacious limitation of the rotary speed of the motor, so that it then acts as a generator and feeds the current produced to the battery. Because, however, with a small shunt portion of the winding, such as is provided because of the characteristic desired for the motor when in operation, sufficient braking force is not available when going down steep ramps, there may be provided, if desired, further in accordance with the invention, a supplementary shunt winding that is switched in for a braking action. This additional and larger shunt winding, in accordance with the invention, is advantageously switched in by means of an element, for example, a centrifugal governor, dependent upon the speed of the motor (operating as a generator). By means of this arrangement, the generator develops a sufficient braking moment.

The drawings show one example of construction of the subject of the invention.

In the drawings:

FIG. 1 is a side elevational view of a fork lift truck in which the invention is embodied, covers having been removed to show the arrangement of the drive system;

FIG. 2 is a somewhat schematic cross-sectional view of a fluid-pump and oil-motor assembly; and FIG. 3 is a view of the fluid-pump control mechanism.

The fork-lift truck is shown schematically, in such a way that the essential parts are visible.

In the vehicle, which is as a whole designated by 10, are housed the compound motor 12 and the battery 14. The motor 12 drives the fluid-pump 16, which can be regulated as is usual for fluid pumps. The volume of oil delivered by the pump is fed to the oil motor 18, which by means of a shaft 20 drives the axle 22. The centrifugal governor 24 serves to switch in the supplementary shunt winding, having a braking action, of the motor 12. The pedal for traveling forward is designated by 26, that for traveling backward by 28. The electrical circuit, being of itself known, is not shown.

The hydraulic transmission, shown diagrammatically in FIG. 2, consists of an infinitely variable pump 16, an oil motor 18, each preferably of the axial piston type, and an interconnecting valve assembly 25. The pump 16 is shown as a swash plate or wobble plate type, which is common in the hydraulic transmission art. The electric motor 12, connected through a suitable coupling 13 to the shaft 30 of the pump 16, turns the swash plate pump 16 at a relatively constant r.p.m. The variable oil flow drives the oil motor 18. It should be emphasized that the transmission is of the hydrostatic type, i.e. where the transmission of energy is achieved by fluid displacement under pressure, with substantially no kinetic energy such as developed in turbines and similar hydraulic transmission systems. Consequently, the speed of the oil motor 18 depends on the rate at which the oil is pumped to it. The torque developed is governed by the pressure of the oil, this being responsive to the load on the motor. The maximum pressure within the transmission is, however, limited by the valve assembly 25.

The pump 16 is connected to the oil motor 18 by means of an interconnecting valve system 25. Appropriate oil conduits 27 and 29 are provided to form a closed oil circuit in the transmission assembly. There are further provided a filter 21 communicating with the interior of the hydrostatic transmission assembly by a conduit 23 and a cooler 31 interconnected with the filter 21 by a conduit 33. The resulting build-up in pressure between the pump 16 and the motor 18 is converted into a corresponding drive torque in the oil motor 18.

The number of revolutions of the output shaft 32 is governed by the volume of oil displaced by the pump 16, while its direction of rotation depends on the direction of oil flow. The oil will flow in one direction or the other depending on whether the cylinder block 34 of the pump is tilted above or below the axis of its input shaft. Since the displacement of the pump may be adjusted from zero to maximum, the r.p.m. of the output shaft 32 will vary accordingly. The r.p.m. may be regulated by operating the foot pedals 26 and 28 (FIGS. 1 and 3). As previously pointed out, the pump 16 is driven directly by the electric motor 12. Rotary motion is transmitted between the input shaft 30 and a cylinder block 34 by piston rods 36 and pistons 38. The cylinder block 34 is contained in a housing 40, thus the pistons and cylinder block will rotate under the influence of the motor 12. When the input shaft 30, and a cylinder block shaft 42 are in axial alignment, the pump is in a neutral position in which its block 34 may rotate but the pistons 38 do not reciprocate. When the pump 16 is angularly rocked in a pair of trunnions 44 and 46, in either an upward or a downward direction from the neutral position indicated in FIG. 2, the pistons will reciprocate through a stroke whose length is in relation to the amount of pump displacement from neutral. The direction of oil flow will depend on the direction in which the pump is tilted.

The pumping action is initiated when the pump housing 40 is swiveled away from its zero position by rotation in its trunnions 44 and 46. The more the pump housing is moved away from its null, or neutral position, the greater the stroke of the pistons 38 and, consequently, the greater the volume of oil that is fed to the oil motor 18.

In both function and construction, the oil motor 18 is similar to the pump. An important difference, however, lies in the fact that the cylinder block 48 of the oil motor is fixed in relation to the output shaft 32. Due to this form of construction, the stroke of the pistons will always be constant.

A double-acting safety valve arrangement 50 limits the permissible working pressure which builds up proportionately to the load on the oil motor. Upon opening, the safety valves will feed the high pressure oil to the return line. A small gear pump 52 housed in a bearing flang 54 equalizes oil losses and adds fresh oil to the closed circuit. Since the capacity of the gear pump is greater than the loss that can occur in the closed circuit, a scavenging valve 57 flushes the surplus oil out of the return line. The scavenging valve 57 is interconnected with the cooler 31 by a conduit 35.

Due to the lines connecting the oil motor 18 and the oil pump 16 being alternately high pressure and return lines, depending on the direction of oil flow, it is necessary to separate the scavenging valve 57 from the high pressure line. This is accomplished by a control valve 56 which, having access to both oil lines, connects the scavenging valve 57 only to the return line.

The speed of the oil motor, as stated, depends on the rate at which oil is pumped to it. The torque developed is governed by the pressure of the oil, this being responsive to the load on the motor, but the maximum pressure is limited by the by-pass valves which pass oil to the return line under excessive pressure.

By way of example, it may be said that the transmission unit of one commercial embodiment of the invention has a nominal output rating of about twenty horsepower, a maximum speed of approximately 2100 r.p.m. and a nominal operating pressure of somewhat in excess of 1700 p.s.i. The hydraulic pump 16 operates at somewhat over 2300 r.p.m. and at a maximum pressure of 2000 p.s.i. It has an output capacity of nine gallons of oil per minute.

Suitable hydraulic transmissions are available. A transmission like that shown in FIG. 2 is Model HW10, manufactured and sold by Güldner-Motoren-Werke, Aschaffenburg, Germany. A similar hydrostatic transmission is manufactured and sold by Vickers Incorporated of Detroit, Michigan.

The manner in which the oil pump 16 is controlled is schematically illustrated in FIG. 3. In this figure, the pump housing 40, which, as shown in FIG. 2, is mounted in trunnions 44 and 46 for rocking motion, is under control of an operating lever 60 which is connected through a pivoted link 62 to a bell crank extension 64 of the pedal 28. The pedal structure 28 is mounted on a shaft 66 to which is fixed a pinion 68 geared directly to a second pinion 70 carried by the shaft 72 of the pedal 26. By reason of the gear connection between the pedals 26 and 28, these pedals are caused to operate in unison such that when the pedal 26 is depressed to tilt the pump in one direction, the pedal 28 will rise proportionately, and vice versa.

It has been pointed out above that the invention is dependent on the unique interplay of the motor characteristics and the characteristics of the hydrostatic transmission. The characteristics of the motor must be such as to maintain a reasonably constant speed without sudden and large demands on the battery current.

A shunt motor whose field is connected directly across the line in parallel with the armature immediately tends to slow down under increased load. More current flows into the armature until the increased current produces sufficient torque to meet the demands of the increased load. The shunt motor is, therefore, essentially a constant speed motor even though its speed does drop slightly with increase of load. The current drawn from the batteries rises sharply as the load increases and, therefore, renders the shunt motor unsuited as a component in the combination of the present invention. The speed of a series motor in which the field winding is interconnected in series with the armature will fall greatly with an increase in load. When the load is decreased, the flux correspondingly decreases and the armature must speed up in order to develop the required back electromotive force. If the load is removed, the flux becomes very small with the result that the motor will run at very high speed.

In a compound motor, however, as in the present invention, which has an additional series winding connected to aid its shunt winding, the series turns increase the flux, causing the torque for any given current to be greater than it would be for the same current applied to the simple shunt motor. On the other hand, this increase in flux causes the speed of the compound motor to decrease more rapidly than it does in the shunt motor and while such decrease is not objectionable, it reduces the battery drain sufficiently to avoid current overdraft or battery damage.

The motor in any event will have a power rating which is substantially less than the rating of the hydrostatic transmission. If the output rating of the hydrostatic transmission is twenty horsepower, a five horsepower motor may be suitably employed. When the hydrostatic transmission has an overrated capacity as suggested, it assumes the attributes of a torque converter.

In operation, higher hydraulic transmission pressure is required when the load on the motor is increased, and this in turn will require more power input to the oil pump. However, a high pressure within the transmission can be achieved at low power input to the pump by reducing the rate of pump delivery. This condition is achieved by reducing the length of the pump piston stroke while maintaining the same speed of rotation. This reduces the motor speed but maintains a very high torque. Under conditions of increased load, the speed of the compound motor will drop somewhat whereby the reduction in pump speed will itself reduce the current load materially. Moreover, the operator will readily sense an increase in load (as during ascending a grade) and he will let up on the pedals, thereby reducing vehicle speed and still further reducing current load while maintaining high torque.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. A drive system for battery operated industrial trucks, comprising a direct current motor having shunt and series windings connected in aiding relationship whereby said direct current motor is characterized by small speed loss and increased flux under increased load, a hydrostatic drive transmission having an output power rating not substantially less than five times the output power rating of said motor, means for infinitely varying the drive torque of said hydrostatic drive transmission, and a drive connection between said motor and said hydrostatic drive transmission.

2. A drive system for battery operated industrial trucks, comprising a direct current motor having shunt and series windings connected in aiding relationship whereby said direct current motor is characterized by small speed loss and increased flux under increased load, a hydrostatic drive having an output power rating substantially in excess of the output power rating of said motor, said hydrostatic drive comprising a pump and an oil motor directly connected thereto, means for infinitely varying the drive torque of said oil motor by infinitely varying the output of said pump, and a drive connection between said motor and said hydrostatic drive transmission.

3. A drive system for battery operated industrial trucks, comprising a compound motor having shunt and series windings connected in aiding relationship whereby said direct current motor is characterized by small speed loss and increased flux under increased load, a hydrostatic drive transmission having an output power rating not substantially less than four times the output power rating of said motor, said hydrostatic drive transmission comprising a pump, an interconnecting valve assembly, and an oil motor, means for infinitely varying the drive torque of said oil motor by infinitely varying the output of said pump, and a drive connection between said compound motor and said hydrostatic drive transmission.

References Cited by the Examiner

UNITED STATES PATENTS

| 2,263,315 | 11/41 | Rose | 60—53 |
| 2,374,909 | 5/45 | Williams | 60—52 X |
| 2,663,143 | 12/53 | Joy | 60—51 |
| 3,014,344 | 12/61 | Arnot. | |
| 3,040,532 | 6/62 | Thoma et al. | 60—53 |
| 3,107,491 | 10/63 | Kaup et al. | 60—53 |

JULIUS E. WEST, *Primary Examiner.*

EDGAR W. GEOGHEGAN, *Examiner.*